Oct. 20, 1925.
E. A. RUTENBER
TOASTER
Filed May 28, 1924
1,558,049
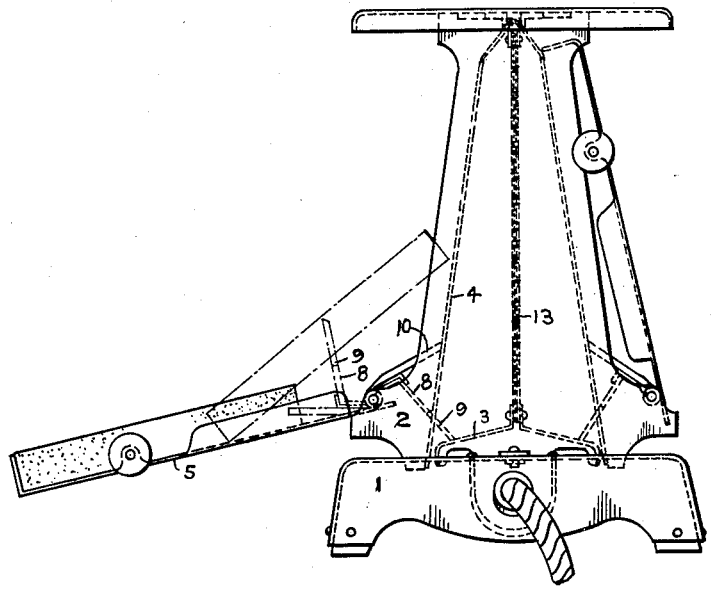
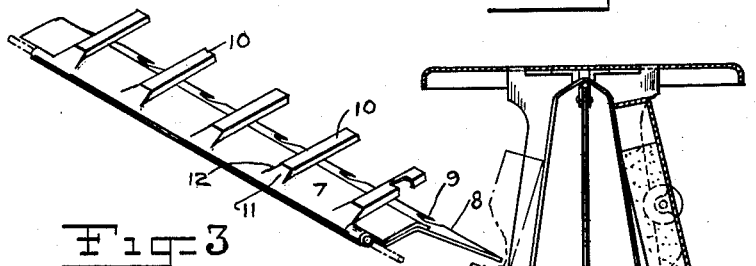
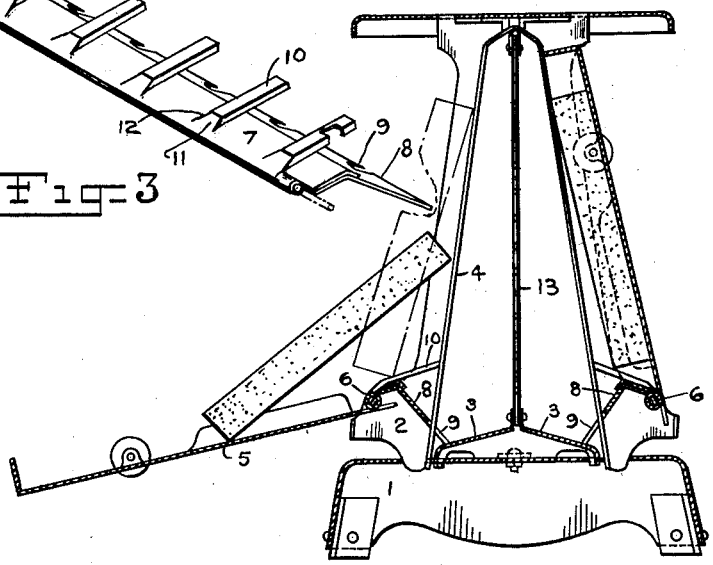
Inventor
Edwin A. Rutenber
By his Attorney Patented Oct. 20, 1925.

1,558,049

UNITED STATES PATENT OFFICE.

EDWIN A. RUTENBER, OF MILWAUKEE, WISCONSIN, ASSIGNOR TO A. J. LINDEMANN & HOVERSON COMPANY, OF MILWAUKEE, WISCONSIN, A CORPORATION OF WISCONSIN.

TOASTER.

Application filed May 28, 1924. Serial No. 716,335.

*To all whom it may concern:*

Be it known that I, EDWIN A. RUTENBER, a citizen of the United States, and a resident of the city of Milwaukee, in the county of Milwaukee, State of Wisconsin, have invented certain new and useful Improvements in Toasters, of which the following is a specification.

The improvements relate to devices for toasting or broiling food, and more particularly to devices of this character which are primarily designed to be employed in the toasting of bread and similar food and in which an electric resistance element is used as a heating medium. They are in the nature of improvements in the pending application of the present applicant and another filed October 18th, 1923, Serial Number 669,217. In the said application a support for the toast or the like consisting primarily of an outwardly inclined shelf is shown, so arranged that the toast will slide outwardly with its inner face down when pressure of the door or holder on its outer side is removed therefrom, and this device has been found satisfactory in operation and very strong and durable. With the present improvements, however, the outward and downward movement of the toast is facilitated to a great extent by the peculiar construction of the shelf and the provision of bars receiving the lower edge of the toast, while at the same time the said lower edge is subjected to direct radiation from the heating element. Circulation of heated air is also permitted between the toast and the heating element, and cold drafts entering at the bottom of the toaster prevented. The construction is also advantageous in other ways which will appear to those familiar with the operation of such devices.

The improvements are illustrated in the accompanying drawings, in which Figure 1 is an end view of a toaster embodying the improvements; Figure 2 is a medial vertical cross section thereof; and Figure 3 is an enlarged detail of the combined toast supporting element and damper.

Upon the base 1 end members 2 are suitably mounted and between these end members a door or holder 5 is hingedly mounted on the bar 6. This member, however, is not essential, and may be entirely dispensed with or replaced by any other device—as for instance a piece of looped wire adapted to be pressed against the toast—and the toast may be manipulated by hand or with a fork or other implement. It will be seen that it is only necessary to place the toast in upright position opposite the heating element and hold it there, and then to release it in order to secure its reversal by the shelf and its members illustrated in Figure 3.

Supports 3 on the base hold a vertical heating element 13, comprising resistance wires properly mounted, and a grid or grate 4 composed of wires mounted in the frame separates the toast from the said heating element and holds it in proper position for exposure to the heat radiating therefrom and the heated air circulating in the interior.

Mounted on the bar 6 as a pivot is the combined reversing shelf and damper, which is preferably formed of a single piece of sheet metal folded, and having its fold around the bar to act as a hinge member. It consists of the shelf 7, with the raised hollow fingers 10 extending rearwardly therefrom and connected therewith by end and side beveled portions 11 and 12 and the damper 8 having recesses 9. The beveled connecting portions between the fingers and the shelf facilitate the movement of the toast outwardly and downwardly by gravity, while the inner ends of the fingers engage the wires of the grid 4, and the recesses 9 of the damper receive them. The lower edge of the damper 8 rests on the support 3, and therefore provides a closure which prevents the entrance and upward passage of cold air induced by the rising heated air and vapor between the toast and the heating element. The entire member comprising the parts just described may be turned on the bar 6 upwardly and outwardly so that crumbs or other particles in the bottom of the toaster may be easily removed.

The provision of means for effectively preventing cold drafts is an improved feature, since such drafts tend to impair the quality of the toast to some extent; the means here provided are simple and effective, and do not in any way interfere with the operation of the toaster or any of the other parts thereof.

What I claim is:

1. In a device of the character described, the combination with a grate disposed in plane approximately parallel with an upright heating element and means for holding articles against said grate, of a laterally disposed support for articles to be toasted, such as slices of bread, said support extending outwardly and downwardly, and having connected therewith a depending member extending below the same and forming a damper to prevent upward draft.

2. In the combination specified in claim 1, the said depending portion and support being pivotally mounted to swing upwardly and outwardly together from normal position.

3. In the combination of parts specified in claim 1, the said depending member having recesses therein through which when in normal position the said grate extends.

4. In a device of the character described, the combination with a grate disposed in plane approximately parallel with an upright heating element, of a laterally disposed support for articles to be toasted, such as slices of bread, said support extending outwardly and downwardly and comprising spaced substantially coplanar article supporting members, and means for holding the article to be toasted in upright position opposite said grate, said means being disconnected from and operating independently of the said support.

5. In a device of the character described, the combination with a grate disposed in plane approximately parallel with an upright heating element, of a laterally disposed support for articles to be toasted, such as slices of bread, said support extending outwardly and downwardly, said support comprising fingers extending inwardly therefrom to said grate and connected therewith by outwardly and laterally beveled portions.

6. In a device of the character described and in combination with means for holding an article in position opposite a heating element, a heating element, a combined support and ejecting reverser for the article to be toasted including a shelf-like member mounted in fixed position and adapted to receive the lower edge of a slice of bread when in upright position opposite the heating element, said member being outwardly and downwardly inclined and having thereon finger-like members raised above the same and extending inwardly therefrom, and merging in the surface thereof on outwardly and laterally extending lines.

7. In a device of the character described and in combination with means for holding articles in upright position, a reversing support adapted to receive the lower edge of a slice of bread to be toasted, while in upright position, comprising a series of finger-like members extending inwardly and upwardly toward the interior of the device and having downwardly and outwardly beveled outer ends over which the said lower edge may slide freely downwardly and outwardly.

Witness my hand this 22nd day of May, 1924, at the city of Milwaukee, in the county of Milwaukee, State of Wisconsin.

EDWIN A. RUTENBER.